US007007465B2

(12) United States Patent
Bruun

(10) Patent No.: US 7,007,465 B2
(45) **Date of Patent: *Mar. 7, 2006**

(54) MOBILE HANDLING DEVICE

(75) Inventor: Lars Bruun, Filipstad (SE)

(73) Assignee: Bruun EcoMate Aktiebolag, Filipstad (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/926,292

(22) Filed: Aug. 26, 2004

(65) Prior Publication Data

US 2005/0016169 A1 Jan. 27, 2005

Related U.S. Application Data

(62) Division of application No. 10/168,302, filed as application No. PCT/SE00/02360 on Nov. 29, 2000, now Pat. No. 6,804,957.

(30) Foreign Application Priority Data

Dec. 27, 1999 (SE) .................................... 9904796

(51) Int. Cl.
*F16D 31/02* (2006.01)

(52) U.S. Cl. .......................................... 60/414; 60/416

(58) Field of Classification Search .................. 60/414, 60/416
See application file for complete search history.

(56) References Cited

U.S. PATENT DOCUMENTS

| | | | |
|---|---|---|---|
| 4,188,787 A | 2/1980 | Bromell et al. | 60/416 |
| 4,928,487 A | 5/1990 | Nikolaus | 60/414 |

FOREIGN PATENT DOCUMENTS

| | | |
|---|---|---|
| DE | 197 21 759 | 11/1998 |
| SE | 455 864 | 8/1988 |
| WO | WO 96/13669 | 5/1996 |
| WO | WO 00/00748 | 1/2000 |

*Primary Examiner*—F. Daniel Lopez
(74) *Attorney, Agent, or Firm*—Michael Bednarek; Pillsbury Winthrop Shaw Pittman LLP

(57) ABSTRACT

The present invention relates to a mobile handling device with a hydraulic circuit, which hydraulic circuit (L) comprises a lifting cylinder (1) arranged in a lifting device (100) suitable for handling a variable load and an accumulator (6) for recovering or recycling lowering load energy, the hydraulic circuit also comprising a variable hydraulic machine (3) with two ports (10, 11), which hydraulic machine is capable via a drice unit (D) of emitting full system pressure in two flow directions to said ports, one port (11) being connected to said accumulator (6) and the other port being connected to said lifting cylinder (1). The device is characterised in that the hydraulic circuit (L) comprises a first stop valve (2) arranged in the line between one port (10) of the hydraulic motor and the lifting cylinder (1), and a second stop valve (5) arranged in the line between the hydraulic motor's second port (11) and the accumulator (6), and that the hydraulic circuit (L) comprises a second accumulator (20), which is connected via at least one non-return valve (31) to the line between the hydraulic machine (3) and the lifting cylinder (1).

13 Claims, 3 Drawing Sheets

MOBILE HANDLING DEVICE

This application is a division of U.S. patent application Ser. No. 10/168,302, filed Jun. 20, 2002 Now U.S. Pat. No. 6,804,957 which is a 371 of PCT/SE00/02360, filed Nov. 29, 2000.

TECHNICAL FIELD

The present invention relates to a mobile handling device with a hydraulic circuit, which hydraulic circuit comprises a lifting cylinder arranged in a lifting device intended for the handling of a variable load and an accumulator for recovering or recycling the lowering load energy, the hydraulic circuit also comprising a variable hydraulic machine with two ports, said hydraulic machine being able to give full system pressure by a driving device in two flow directions to said ports, wherein one of the ports is connected to said accumulator and the other port is connected to said lifting cylinder.

DESCRIPTION OF PRIOR ART AND PROBLEMS

Excavators, trucks, container handlers etc. and a large number of other mobile handling machines which are intended to handle a variable load have one or more lifting cylinders for lifting the load for which the unit is designed. The great majority of mobile handling devices used today have no energy recovery facility whatever for the lowering load, meaning that the lowering load energy, most often in connection with passage via a control valve which determines the lifting and lowering motion, is converted to heat which then has to be cooled away. The heating of the hydraulic oil to undesirable temperatures is a long familiar problem for machinery manufacturers and end customers.

For several years, a plurality of inventors have been working on recovering the energy losses which arise in a lifting system without any ballast weight balancing away the weight of the arm system. For different reasons they have not managed to obtain a commercially useful solution, as all the time there exist weaknesses implying unacceptable results. Below, different reasons for said problems are mentioned.

A device with an auxiliary cylinder, which is more or less directly connected to one or more accumulators, creates difficulties, as the arm system to a large extent influences the hydraulic pressure in the lifting cylinder depending on the working radius used. The system must thus balance towards the lowest pressure which may exist at a short working radius, which is a problem.

In those solutions where attempts have been made with the lifting cylinder in a closed circuit together with a hydraulic machine, wherein oil is pumped to and from an accumulator the problem is to compensate the leakage losses, which are unavoidable in all rotating hydraulic machines. When the hydraulic oil has run short in the accumulator, which happens simultaneously, the need of a power peak will immediately arise, which results in difficult problems, which to a great extent lessens the value of such a solution.

SHORT DISCLOSURE OF THE INVENTION

An object of the invention is to eliminate or at least minimize the above mentioned drawbacks, which object is achieved by a mobile handling device according to the characteristic part of patent claim 1.

The invention provides many advantages and i.a. a considerable reduction of the engine power. The invention has so far been tested in an excavator of the size 20 tons but is also applicable on practically all lifting devices.

At least the following important advantages are achieved with the invention:

1 At least the major part of the position energy, which is transformed when the arm system is lowered, is recovered.

2 Said position energy, which is transformed during the lowering step, is recovered to a large extent without being transformed to heat.

3 A comparatively low engine power can be installed by, during the lifting operation, utilizing the energy which have been stored during the lowering step, and preferably by utilizing in an optimal way the engine power to load the accumulator alternatively the accumulators, when the power is not utilized for any other purpose.

BRIEF DESCRIPTION OF DRAWINGS

The invention will be described below more in detail in connection with the enclosed drawings, in which.

DETAILED DESCRIPTION

Figure 1:
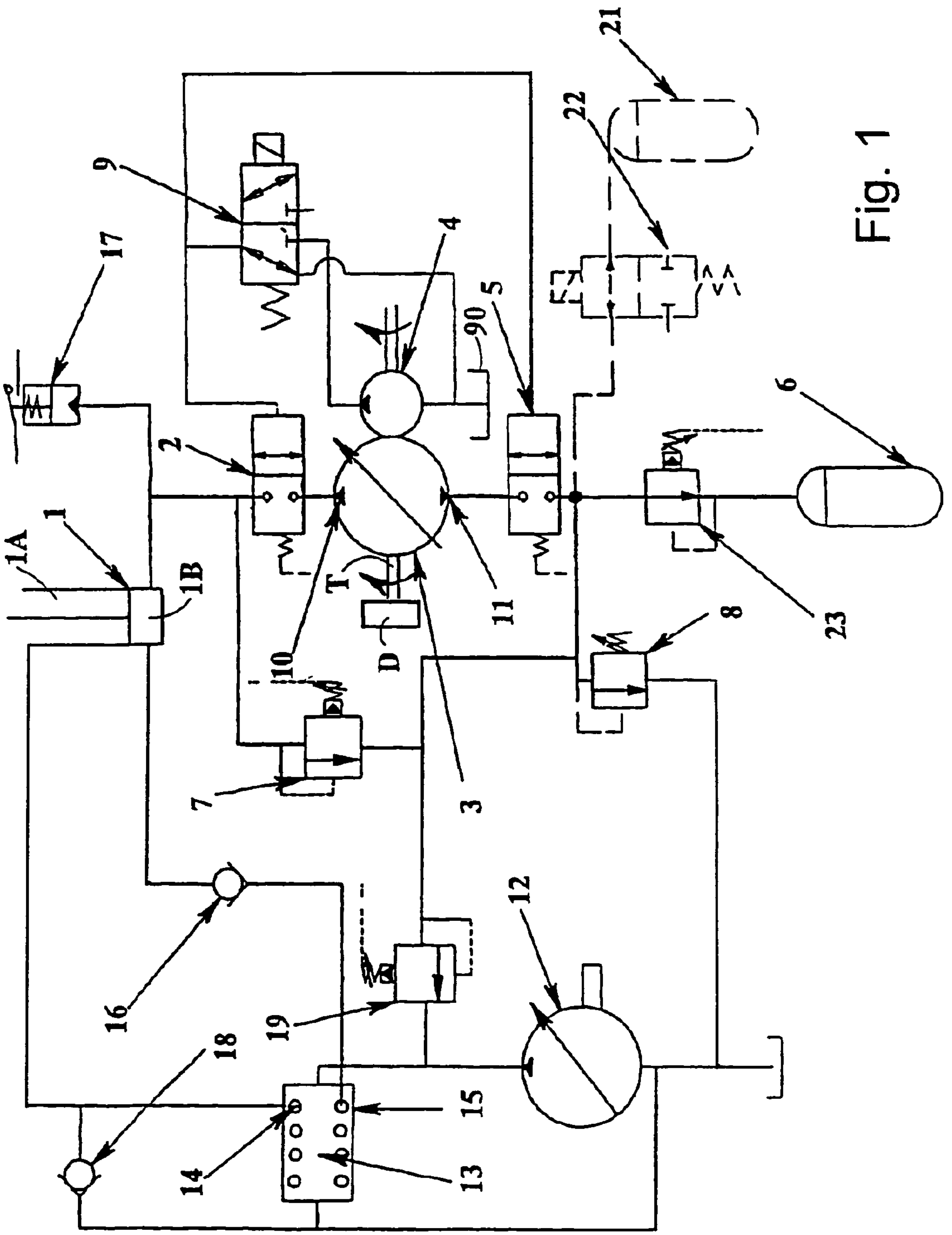
FIG. 1 schematically shows a first hydraulic circuit, in relation to which the present invention implies an improvement.

FIG. 1 shows a hydraulic scheme for a lifting cylinder in a hydraulic circuit according to PCT/SE99/01131. A double-acting hydraulic cylinder 1, a variable reciprocating pump 3 (which is called a hydraulic machine below) and an accumulator 6 are shown. The hydraulic circuit is disposed in a mobile handling device, for example a truck or excavator, the lifting cylinder 1 thus being provided to carry out vertical work in the handling device's lifting device, for example the arm which carries the bucket on an excavator. Disposed between the lifting cylinder 1 and the hydraulic machine 3 is a logic element 2, in the form of a stop valve, which is spring-loaded and which in its uninfluenced state breaks the connection between the hydraulic machine 3 and the lifting cylinder 1. In its activated position, the valve device 2 gives open communication between the hydraulic machine 3 and the lifting cylinder 1. This logic element 2 also preferably functions as a hose-breaking element. A similar logic element 5 is disposed between the accumulator 6 and the hydraulic motor 3, with a function similar to the first-mentioned logic element 2. This too is in the form of a stop valve 2. Both these valve devices 2, 5 are controlled by means of a servo system 4, 9, consisting of a servo pump 4 and a valve 9. The servo pump 4 is operated by an independent source, normally the handling device's fuel-based motor D, which appropriately also drives the variable reciprocating pump 3. Operation takes place in a known manner via a suitable transmission. The hydraulic flow from the servo pump 4 can act via the valve 9 on the logic elements 2, 5 to open the connection in the respective line 3-1, 3-6. The servo valve 9 is normally controlled by an operator, if applicable by an automatic monitoring system, in such a manner that when it is desired to carry out work with the lifting cylinder 1, the servo valve 9 is actuated to open the connection between the pressure side of the servo pump 4 and the lines 9-2, 9-5, which lead to the logic elements 2, 5, so that the oil pressure is supplied when these open. As soon as actuation of the servo valve 9 ceases (this resumes a non-acting position for example by means of spring force), no signal is emitted to the logic elements 2, 5, so that the pressure side of the servo pump 4 is cut off from connection to the lines 9-2, 9-5, the lines 9-2, 9-5 instead being connected to a return line 9-90, which leads to an unpressurized tank 90. By means of this servo circuit 4, 9, it is thus ensured that an open connection always exists when there is a need for a lifting or lowering motion, at the same time as the valves eliminate unnecessary leakage through the hydraulic motor 3. Of course, a variable hydraulic machine (sometimes also called the hydraulic motor) always has a certain leakage. Thus it is desirable to shut off the connection to pressurized parts when the system is in the neutral position to eliminate unnecessary leakage.

The hydraulic machine 3 is a variable reciprocating pump which can both receive and emit oil at the ports 10, 11. The pump is of a known type which permits full system pressure at both outlet ports and in which the flow can be adjusted from zero to maximum by means of the variable setting, which is normally achieved by means of a so-called swash plate. Using a pump of this kind eliminates the need to regulate the circuit via a control valve, whereby a considerable simplification is achieved at the same time as control losses are reduced.

Furthermore, a sequential valve 7 is included in the hydraulic circuit. The sequential valve 7 is disposed in a line 1-6, which connects the lifting cylinder 1 to the accumulator 6, by means of which it is possible to relieve any excess pressure in the line 1-2 between the lifting cylinder and the logic element 2 via the sequential valve 7 to the accumulator 6, so that the energy is retained in the system.

A safety valve 8 is provided in the system between the accumulator 6 and a tank 42, which ensures that a certain maximum pressure for the circuit is not exceeded. A pressure-reducing valve 23 is disposed between the accumulator 6 and the logic element 5. The pressure-reducing valve ensures that the accumulator pressure does not exceed the maximum value permitted for the accumulator type, meaning that the accumulator does not necessarily need to be of the same pressure class as the rest of the system.

Furthermore, it is shown that the hydraulic circuit is connected to the handling device's conventional hydraulic pump 12, the flow of which is regulated in a conventional manner via a control valve 13. Due to this oil can be routed via one of the ports 14 on the control valve 13 to the opposite side 1 A of the double-acting cylinder 1. Furthermore, oil can be supplied via the control valve 13 via a second port 15 to the piston side 1 B of the lifting cylinder 1. In the line 15-1, disposed between the control valve 13 and the piston side 1 B of the lifting cylinder 1 is a non-return valve 16 which prevents oil being routed from the piston side 1 B of the lifting cylinder to the control valve 13. The hydraulic pump 12 collects its oil in the normal manner from the tank 42. The control valve 13 is normally connected by one end 13-42 to the tank 42, while its other end 13-12 is connected to the hydraulic pump 12. Furthermore, the system has a sequential valve 19 which can return surplus oil from the lifting circuit 1. 3, 6 to the control valve 13, where it can be used for example to manoeuvre the stick on an excavator. Finally, it is shown that the system can include an additional accumulator 21, which can either be disposed to be connected or not connected to the circuit via a valve 22. This extra accumulator 21 can be used either to ensure that sufficient hydraulic oil is to be found in connection with certain working operations and/or to provide the circuit with a different pressure level in connection with certain working operations.

A pressure-sensing element 17 is provided to register the pressure in the line between the lifting cylinder 1 and the logic element 2. In the event of a lowering motion which requires power, the pressure-sensing element 17 will register that the pressure is below that required for the function and ensure that the control valve 13 emits oil to the rod side of the lifting cylinder via the port 14.

The system functions such that in the event of a lifting motion, the operator will send a control signal to the control servo (not shown), which will activate the valve 9 which in turn ensures that the valves 2 and 5 open. The connection between the accumulator 6, hydraulic machine 3 and lifting cylinder 1 is thus completely open. The pressurized oil in the accumulator 6 flows then to the variable hydraulic machine 3, which conveys the oil onwards to the lifting cylinder 1. If the pressure in the accumulator in this case is higher than that required to carry out the work using the lifting cylinder 1, the surplus energy will be supplied by the hydraulic machine 3 to the drive system, best achieved via the transmission T. If the accumulator pressure should not be quite sufficient, the variable hydraulic machine 3 provides a pressure increase to reach the requisite pressure level, which is achieved by means of power which is supplied via the handling machine's motor D. Thus in such a situation only as much energy is supplied as is required to overcome the pressure difference between the accumulator and the lifting cylinder's requirement. In the event of a lowering movement, the direction of flow in the pump is changed and oil is supplied at port 10 and emitted at port 11 to be supplied to the accumulator 6. If the pressure in the accumulator 6 is then lower than at the lifting cylinder 1, the variable hydraulic machine 3 will be able to supply energy to the transmission T. If on the other hand the pressure in the accumulator is higher than in the lifting cylinder, additional energy from the motor D will need to be supplied to the variable hydraulic machine 3 to obtain a lowering movement. However, this energy supplied is stored in the accumulator 6 and is therefore accessible in connection with the next lifting movement. It is evident from the above that the system is energy-saving and eliminates heat-generating throttling of the oil flow which normally occurs when the lowering energy is handled in conventional systems.

The task of the pressure-sensing element 17 is to ensure that the hydraulic machine 3 adjusts the flow down to zero when the hydraulic cylinder no longer has any pressure, for example when the bucket has reached ground level.

In the case of a lifting motion which it is desired to be performed quickly, a normal requirement for example in deep cut digging, both the variable hydraulic machine 3 and the hydraulic pump 12 can be activated, in which case the oil obtained from the accumulator does not fully correspond to the amount of oil of the lifting cylinder. During a lowering movement, the non-return valve 16 will prevent the oil from flowing to port 15. On the next lowering movement, therefore, an amount corresponding to that obtained from the pump 12 must be evacuated from the circuit via the safety valve 8. Alternatively, the sequential valve 19 can be used to return the surplus oil to the inlet side of the control valve 13, to be used for example for the slewing motion on an excavator. Oil for the rod side of the double-acting lifting cylinder 1 can be obtained via a so-called refill valve 18, in the form of a non-return valve, which is disposed between the outlet side of the control valve and the line 14-1 which leads to the rod side of the lifting cylinder 1.

Figure 2:
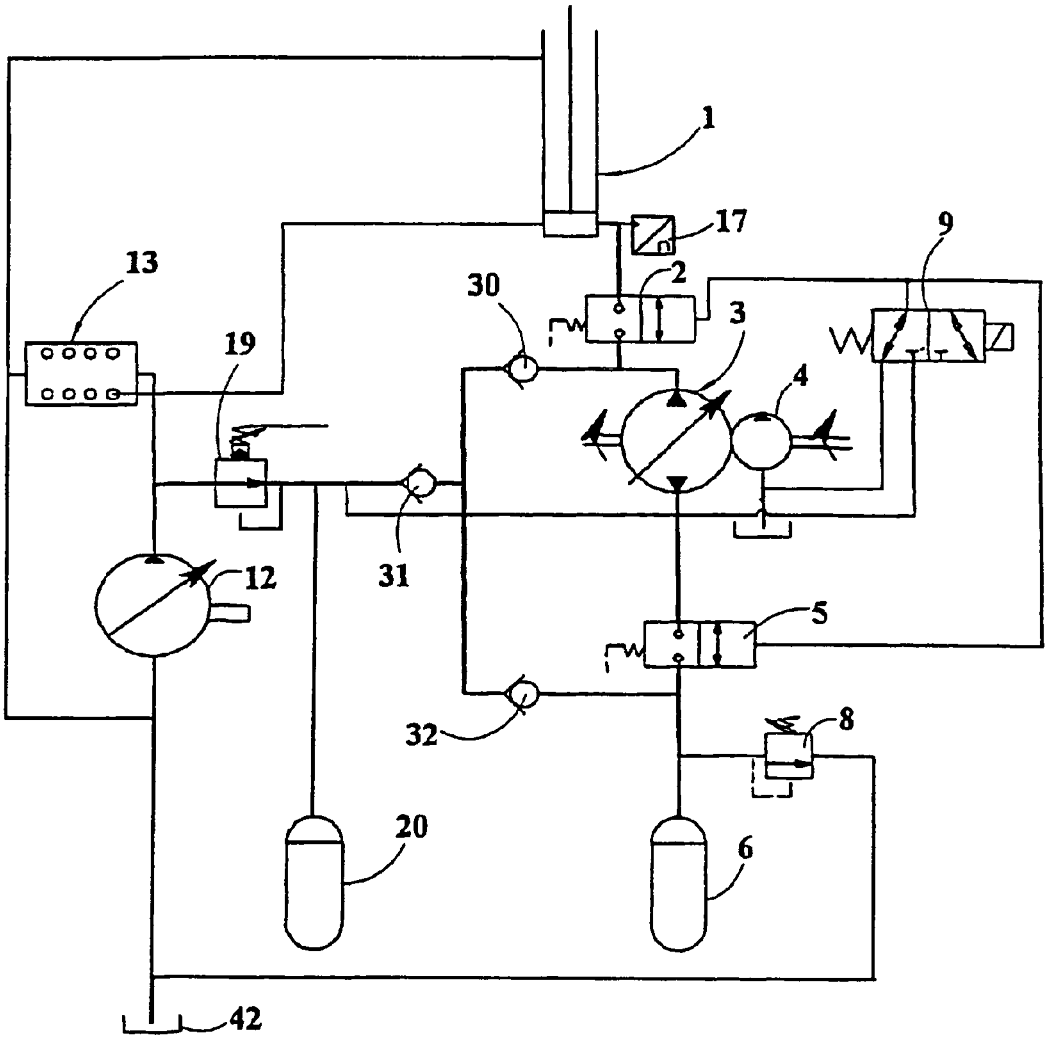
FIG. 2 schematically shows a second hydraulic circuit, in relation to which the present invention implies an improvement.

FIG. 2 shows a preferred hydraulic scheme for a hydraulic circuit, which mainly functions according to the principles described in connection with FIG. 1. FIG. 2 shows a hydraulic circuit which in total consists basically of the same sub-components as described in FIG. 1. Only the essential differences will therefore be described below. It is shown that an additional accumulator 20 is provided in connection to the circuit. This additional accumulator 20 has a lower system pressure than the main accumulator 6. The second accumulator 20 is connected to the main system 6, 3, 1 via non-return valves 30, 31, 32. A first line 2-20 is connected to the line between the logic element 2 and the top port 10 of the hydraulic machine 3 via a first non-return valve 30. A second line 5-20 is connected to the line between the accumulator 6 and the logic element 5 via a second non-return valve 32. The two lines are brought together to the opening side of a common non-return valve 31 which is connected via its closing side to the accumulator 20. The task of this additional accumulator 20 is to be able to supply oil instantaneously to the variable reciprocating pump 3 when urgently required. An urgent requirement of this kind arises when the main accumulator 6 becomes empty. Emptying of the main accumulator 6 takes place namely instantaneously in the course of a very short period of time without any actual advance warning that the amount of oil is about to run out. The conventional hydraulic pump 12 does not manage in this case to deliver oil in the short time which is available, meaning that a risk of total destruction of the variable reciprocating pump exists. This risk of destruction is thus eliminated by means of the extra accumulator 20 which can supply oil directly to the circuit 6, 3, 1 via the non-return valves when the system pressure drops rapidly. Furthermore, it is shown that a pressure monitoring element 17 is disposed connected to the lifting cylinder, with the same function as according to FIG. 1. The safety valve 8 ensures that the permitted system pressure for the accumulator 6 is not exceeded. The system otherwise functions as described in connection with FIG. 1.

Figure 3:
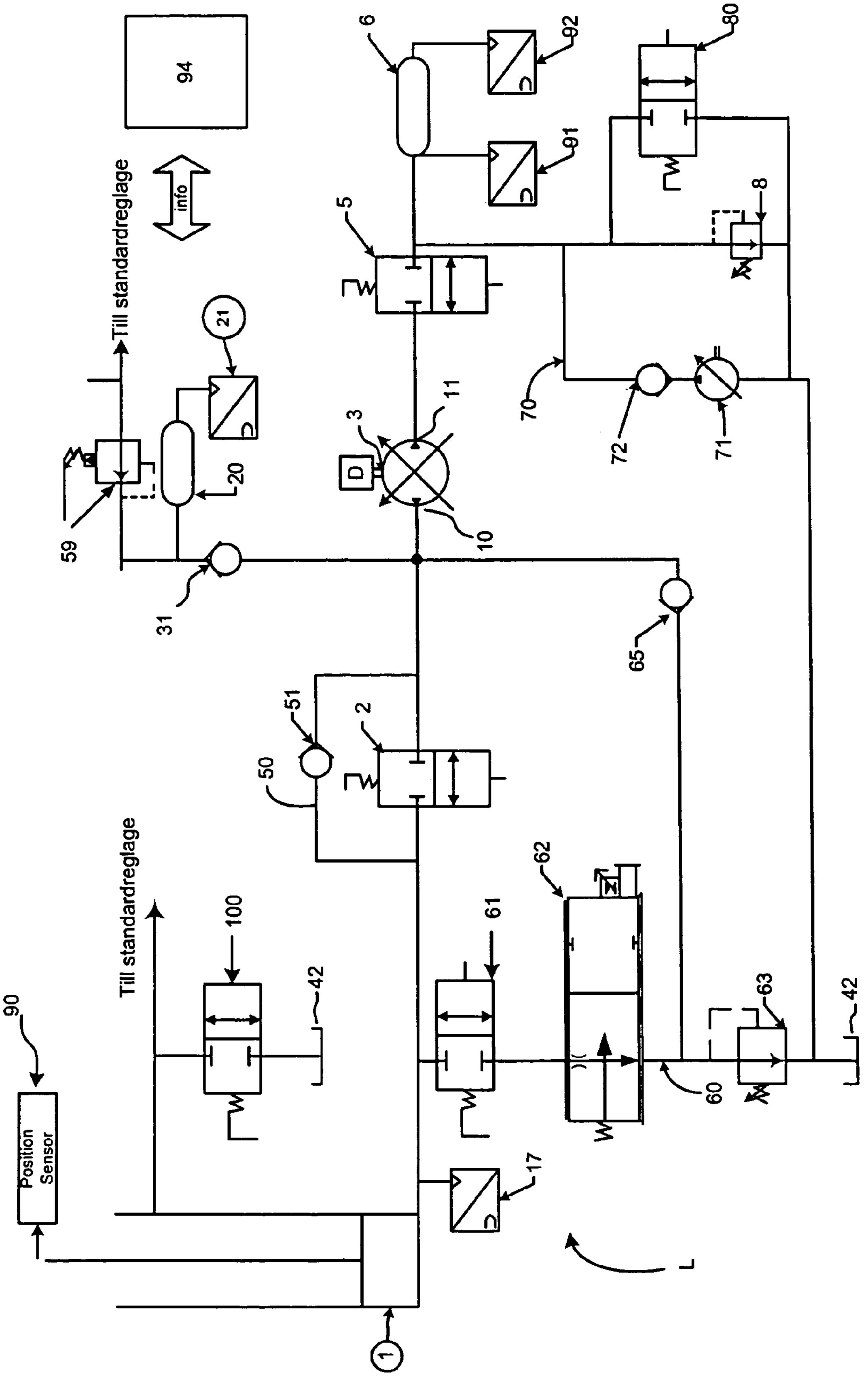
FIG. 3 schematically shows a hydraulic circuit according to the invention.

FIG. 3 schematically shows a hydraulic circuit according to the invention. The invention functions mainly in the same way as described according to FIG. 1 and FIG. 2. In order to facilitate the understanding, the same components, according to the invention (FIG. 3) and according to FIGS. 1 and 2, respectively, have got the same denotations. Thus, there are i.a shown a hydraulic machine 3, which allows full pressure on inlet as well as outlet, and one (or several) accumulator/s 6. Further, a proportional valve 62 is shown, which allows small lowering motions without utilizing the hydraulic machine 3, and which valve also increases the capacity of the lowering motion when the hydraulic machine reaches its maximal capacity. Further, the system is controlled by a computer system 94, which obtains information from sensors regarding pressure 91 and 92, respectively, position 90, and the rotation speed of the engine.

When lowering the lifting cylinder, the major portion of the oil will be pumped to the accumulator system 6, but when the arm system suddenly is relieved, when the bucket for instance hits the ground a pressure sensor 73 in the lifting circuit must emit a signal to the computer to justify the pumping capacity downwards. During the transient time of the hydraulic machine, it must be supplied with oil in order not to be destroyed (not to seize), and this amount is obtained from the refilling circuit, which consists of the accumulator 20, the non-return valve 31 and the pressure reducer 59, which receives its oil from the open circuit of the machine.

The hydraulic machine chosen in the system has like all rotating pumps a volumetric loss, which at full flow and pressure may be expected to amount to 5% but at low flows it may be close on 100%, and said loss of liquid must inevitably be replaced. It is important to realize that said loss is practically independent of the deflection of the hydraulic machines or its flow. At a lowering motion, the amount of oil which is delivered by the lifting cylinder will thus not be found in the accumulator but a portion thereof will run to the tank 42 via the leakage line of the hydraulic machine. Except said leakage, consideration must also be taken to the amount which is drained via the valve 62. It must be possible to control the lowering motion of a machine with great accuracy, and the hydraulic machine 3 does then not give sufficient control. For this reason, there is a valve 62 in the lowering circuit, which allows complete control. A lowering motion will take place only via the valve 62 if small motions or great accuracy are required.

The hydraulic machine 3 has a size which allows full lifting speed, but it will be considerably more expensive to give the hydraulic machine a size which also manages full lowering speed, which is approximately 50% higher, i.e. which should require a flow which is approximately 50% higher. Further, this would imply a considerably extension of the line areas etc. The valve 62 thus has two functions, partly to allow complete control at low lowering speeds, partly to increase the maximal lowering speed at high lowering speeds. Or in other words, the valve 62 allows that a hydraulic machine having considerably lower capacity than what is shown in FIGS. 1 and 2 may be used. This control, sequential control, is performed by the computer.

In order to solve the problem which arises in connection with the filling of the accumulator 6 with oil to ensure next lifting motion the following details have been added. The lifting piston 1 has been provided with a position sensor 90 giving a signal to the computer, which also receives a signal from the accumulator system 6 by a sensor 91. Then the computer 94 calculates the need and emits a signal to the pump 71, which attends to desired/sufficient pressure being established, which in turn determines the amount in the accumulator. Said refilling of the accumulator is thus performed independent of a lowering motion or lifting motion being made or other functions being utilized. If the maximal pumping capacity for the lifting motion is, say 100, the capacity of the pump 71 only has to be a fraction thereof.

The reason is that said refilling of the accumulator takes place during the entire operation period of the machine. Let's assume that the lifting cylinder needs 35 l. To perform a full stroke, there must be a sufficient amount plus an amount for the volumetric loss in the accumulator, now assuming that this amount is 5 l. At the preceding lowering motion an amount of 35 l less the volumetric loss less the amount which was drained by the valve 2, was obtained, which can be assumed to be 10 l. The pumping capacity is calculated to perform a lifting motion of 6 sec, which implies a need of 350 l/min. A complete digging operation can be assumed to take minimum 20 sec. and the capacity of the pump 71 must then be 15 l/20 sec or 45 l/min.

In order to be able to perform a complete lifting cycle at full speed, a power of $350\times250/600=145.8$ kW×the efficiency is needed. The pressure is according to experience the mean value which is used in this assumption. If the mean pressure in the accumulator is assumed to be 175 bars, the following energy is required according to the invention, 350×75/600=43.7 kW plus 45×175/600=13.1 kW, thus totally 56.8 kW×the efficiency, and the power need has thus been reduced by approximately 60% in the lifting motion. In order to improve the efficiency of the system further, the capacity of the pump 71 is increased, so that the loading of the accumulator can be performed during the 14 sec when no lifting motion is going on.

In order to determine the usefulness of the invention the following should be considered.

1 The engine efficiency of an excavator or any other lifting machine is substantially determined by the lifting motion.

2 The fuel consumption of a diesel engine is to a large extent determined by the maximal capacity. As the capacity must be available immediately at a lifting motion, a temporary increase of the engine speed at a lift which takes long time. The fuel consumption of a diesel engine is more dependent upon engine speed and size than of the power output. The indicated figures of the fuel consumption are always related to the best engine speed for the power output. The idle consumption increases drastically at increased engine speed. At performed measurements, the consumption increases by more than 500% from low idle to overspeed. At full working speed; which is normally used for an excavator, the fuel consumption amounts to about 30–35% of the maximal consumption, when no power is drawn. As the invention permits a reduction of the engine speed by minimum 30% without lowering the capacity, it is realized that an important saving of fuel may be achieved.

A great advantage according to the invention thus depends on the system with a separate valve 62 for the control of the lowering speed, which implies complete control and that the same valve can be used to obtain full lowering speed. Through the inevitable volumetric losses which are the case in a pressurized hydraulic system, the lowering motion will require that the hydraulic machine gets an increase signal when low lowering speeds are required. In addition, when the hydraulic machine is not pressurized, the lowering speed will be load dependent, which is not acceptable from an operating point of view. When low lowering speeds are desired, the computer does not emit any signal to the hydraulic machine 3 or to the valves 2 and 6 but only to the valves 7 and 62. In this way, an exactly controlled motion with immediate response is obtained. In this connection it should be pointed out that the adjusting times of such a hydraulic machine 3 normally are felt too long. When a higher lowering speed is desired, the computer emits a signal to the valves 2 and 5 to open while the hydraulic machine 3 is moved outwards. When a complete movement outwards of the hydraulic machine 3 has been achieved, the computer emits a signal to the valve 62 to increase the flow to a desired level. The maximal flow via the valve is 50% of the pumping capacity. The overflow valve 63 is provided in order to pressurize the hydraulic machine 3 before the valves 2 and 6 open. This implies that a "dip" in the lowering operation is avoided. The non-return valve 51 is provided so that no "dip" may occur at the lifting operation. The non-return valves 65 and 31 do not prevent desirable flows.

In the computerized control system 94 an optimal power output function is included, which is based on the fact that when no power is taken out, the engine speed will lie at overspeed for the given output position. According to experience, the engine is completely loaded when the motor speed has fallen by x %. When the engine has a loading degree which is less than a given value, for instance 80%, a signal is emitted by the computer to the pump 71 to increase the pressure level by a suitable percentage in the accumulator system 6 towards the minimal level which is required to ensure the lifting requirement. Said superposed power will additionally make a power reduction possible at the subsequent lifting operation. In the computerized program for the pressure increase in the accumulator circuit 6 an adaptive function has also been included, which will imply that the system is adapted to the pressure with which the accumulator is loaded to the position which the lifting cylinder has taken at an optional number of previous lowering operations. The accumulator system is designed and calculated to allow accommodation within the system of the amount of oil available in the lifting cylinder. The operation field of an excavator is calculated and designed to cover a considerably larger field than which the machine normally is used for. Normally, no more than 60–70% of the stroke length of the lifting cylinder is utilized but in the calculation of the size of the accumulator, the maximal amount of oil which can be received by the accumulators must be taken into consideration. In order not to obtain extremely large and expensive accumulators, the gas pressure must be lowered towards the ideal level so that the end pressure will not be too high when the lifting cylinder stands in its bottom position. The adapted function sees to it that an increase of pressure occurs, when the system has received information that only a limited portion of the stroke length of the lifting cylinder has been utilized. The overflow valve 22 ensures that no higher pressure than the permitted one occurs, when a way of driving arises, which was not present previously.

According to further aspects of the invention, the following features are also valid:

A device in a lifting circuit consisting of one or several lifting cylinders and of a valve arrangement 61, 62, 2, which connects the lowering side of the circuit to the hydraulic machine 3, which in turn via a valve 5 is connected to the accumulator system 6, which makes it possible to utilize the lowering power established by the lifting cylinder 1 influenced by the load and arm system, wherein the power obtained in this way will be utilized at next lifting motion, when the previously pressurized oil is routed by the valve 5, by the hydraulic machine 3 and by the non-return valve to the lifting cylinder and that the amount of oil which is lost in the system through the inevitable losses is replaced by the pump 71, which receives its movement from a is computer 93, which in turn i.a. is controlled by the position sensor 90 and the pressure sensor 91;

That the valve 61 opens to the valve 62, which empties a minor, controlled flow via the overflow valve 63 to a tank, that the valve 62 is controlled by the computer in such a way that when the flow has to exceed a predetermined value, said extra flow will be routed via the hydraulic machine 3 to the accumulator, and when the maximal pumping capacity is fully utilized, the valve 62 will be able to increase the lowering speed when necessary. The valve 62 will thus allow that small flows, which must be controlled entirely, can be drained to a tank, except, when necessary, it being able to increase the lowering speed more than the hydraulic machine 3 permits;

That there is a pressure sensor 73 in the lifting cylinder circuit, which, when the pressure falls below a predetermined value, emits a signal to the computer, which controls the hydraulic machine 3 down to minimal deplacement. During this inward turning, which is not instantaneous, the hydraulic machine has to receive oil in order not to break down, and said amount is obtained from the accumulator 92 via the non-return valve 31, the purpose of which is to prevent that the accumulator 20 is pressurized above a predetermined low level, which is registered by the pressure reducing element 59, which is fed from the open hydraulic system of the machine;

That the accumulator circuit 6 is provided with a pressure sensor on the gas as well as the oil side. At start, the valve 80 has managed the oil side to be drained to the tank, which implies that it has been possible to control the gas pressure and to register the value in the computer. This information is important, so that the loading process of the pump 12 may be performed in an optimal way, and that the minimal deplacement of the hydraulic machine 3 may be controlled before the accumulator 6 is quite empty;

That the position sensor 90, except its primary purpose to transmit a signal to the computer how the pump 12 should be controlled, also is used to register how much of the stroke length of the lifting cylinder is utilized. If the lifting cylinder during a number of strokes has not used more than a limited portion, the computer can easily calculate this and transmit a signal to the pump 71 to increase the pressure level, which in turn implies that the efficiency is improved. The valve sees to it that the maximal level, which is calculated for the system, is not exceeded:

That the motor efficiency is continuously surveyed and that at small power outputs the accumulator system 6 receives an increased pressure level, which is calculated in such a way that it normally will not be necessary to add oil to the accumulator system including the pump 71 during the lifting process.

The invention is not restricted to the above description but can be varied within the scope of the following patent claims. It is perceived for example that the servo pressure can be obtained from a source in the system other than the pump 4, e.g. from the accumulator 20. It is furthermore perceived that one is not limited in any way to using just one lifting cylinder but that also two or more lifting cylinders can be used in a circuit according to the invention. The same is naturally true also of the number of accumulators, which can be varied as desired or needed. It is also perceived that a number of modifications can be made with regard to the valve arrangements without it affecting the principles of the invention. Furthermore, it is perceived that multiples of the constituent elements can be used, for example a plurality of lifting cylinders. Furthermore, it is perceived that the invention can also be used in similar handling machines other than those previously named, for example forestry machines, so-called croppers etc.

The invention can also be utilized in connection with the use of a control valve via which the hydraulic oil is routed to and from the accumulator or lifting cylinder. Here it holds good that the potential energy which is in the lifting piston will in the event of a lowering movement be returned to the accumulator via the control valve, which accumulator in turn is connected to the variable reciprocating pump. A precondition however is that the accumulator pressure is below the lifting cylinder pressure and that before a state of equilibrium arises a separate return line to the tank is opened. In a lifting movement the pressurized oil in the accumulator will provide the pressure increase or pressure drop in the reciprocating pump necessary for the requirement to execute the desired work. If for example the lifting work calls for 200 bar and the accumulator pressure is 100 bar, the stored energy has executed half the lifting work. It is preferably the case that the control valve is supplied with hydraulic medium from the lifting pistons via the regular pump inlet and that the control valve is provided with pressure compensation which on activation of the valve emits a pressure-compensated flow to the engine port.

To modify the invention for fork lift trucks, which are characterized by a form of working in which it was not possible using the previous technology to recover the lowering load energy, the following applies. The normal cycle for a fork lift truck is to lift or lower a load, it not being possible to determine the sequence for these operations, but rather the task controlling the course of events. Due to the design of the lifting cylinder, as much oil is used to lift the forks empty as with a full load, only the pressure varies. The hydraulic system for a fork lift truck with energy recovery should therefore be completed by a valve which in the event of a low lowering load automatically opens a valve which is connected to the tank when $\Delta p$ between the cylinder pressure and accumulator falls below a predetermined value. In this regard a valve actuated by the operator is naturally conceivable.

What is claimed is:

1. Mobile handling device with a hydraulic circuit, the hydraulic circuit (L) comprising:

a lifting cylinder (1) arranged in a lifting device suitable for handling a variable load and a first accumulator (6) for recovering or recycling lowering load energy;

a variable hydraulic machine (3) with two ports (10, 11), which is capable via a drive unit (D) of emitting full system pressure in two flow directions to said ports, one port (11) being connected to said first accumulator (6) and the other port being connected to said lifting cylinder (1);

a first stop valve (2) arranged in the line between one port (10) of the hydraulic machine (3) and the lifting cylinder (1), and a second stop valve (5) arranged in the line between the hydraulic machine's second port (11) and the first accumulator (6);

a second accumulator (20), which is connected via at least one non-return valve (31) to the line between the hydraulic machine (3) and the lifting cylinder (1), wherein the maximal flow capacity for said hydraulic machine (3) preferably is less than the maximal output flow from said lifting cylinder (1) at a rapid lowering motion;

a line (6-42) connected to the first accumulator (6) and running to a first tank (42) via an overflow valve (8) and a by-pass line (70) around said overflow valve, which by-pass line comprises a variable pump (71) and a non-return valve (72), said non-return valve preventing oil running from the first accumulator to the variable pump (71); and a position sensor (90) connected to the lifting cylinder (1) and registering the position of the piston within the cylinder (1), a first pressure sensor (92) registering the gas pressure in the first accumulator (6), a second pressure sensor (91) registering the oil pressure in the first accumulator (6), and a computerized control unit (94), wherein information from said sensors (90, 91, 92) is used in said control unit (94) for controlling the variable pump (71) to ensure that a certain minimal pressure always is retained in said first accumulator (6).

2. Mobile handling device with a hydraulic circuit according to claim 1, wherein the drive unit (D) being the driving source to the handling machine emits a signal dependent on speed, which signal controls the control unit (94) together with a operating signal from the operator, so that the pump (71) get a signal of increased pressure level, wherein the pressure in the first accumulator (6) is increased, when the speed of the drive unit (D) approaches the overspeed for the operating signal in question.

3. Mobile handling device with a hydraulic circuit according to claim 1, further comprising a tank line (60) connected to the lifting side (1-10) of the lifting cylinder (10) and running to a first tank (42) via a proportional valve (62).

4. Mobile handling device with a hydraulic circuit according to claim 1, wherein the signal from the position sensor (90) is used to inform the control unit (94) about a repetitive operation cycle and that if a maximal stroke length has not been utilized in said operation cycle the control unit (94) controls the pump (71) to increase the pressure level in the first accumulator (6).

5. Mobile handling device with a hydraulic circuit according to claim 1, further comprising a valve (80) which makes emptying the first accumulator (6) to a first tank (42) possible to ensure pressure control of the gas pressure in the first accumulator.

6. Mobile handling device with a hydraulic circuit according to claim 1, further comprising a pressure monitoring element (17) provided in direct connection to the lifting side (1-10) of the lifting cylinder (1) which registers and emits information about the pressure to the computerized control unit (94), which in turn minimizes the flow in the hydraulic machine (3), when a predetermined minimal pressure (pmin) has been achieved, and shuts said stop valves (2, 5).

7. Mobile handling device with a hydraulic circuit according to claim 6, wherein said control unit (94) at a lifting motion of said cylinder (1) only controls the hydraulic machine (3) and said second stop valve (5).

8. Mobile handling device with a hydraulic circuit according to claim 6, wherein the system pressure in said second accumulator (20) is considerably lower than in said first accumulator (6).

9. Mobile handling device with a hydraulic circuit according to claim 6, wherein an additional stop valve (100) is provided in connection to the bar side of the cylinder (1) allowing a connection to a second tank (42), and which valve (100) opens connection to the second tank (42) if said pressure monitoring element (17) registers a pressure above a given minimal level in said control unit (94).

10. Mobile handling device with a hydraulic circuit according to claim 1, further comprising a line (60) connected to the lifting side (1-10) of the lifting cylinder (10) and running to the first tank (42) via a proportional valve (62) and a hose breakage valve (61), wherein said control unit (94) at a lifting motion of said cylinder (1) in a first sequence opens the hose breakage valve (61) and controls the proportional valve (62) to make a thoroughly controlled, small lowering speed possible, that, if there is a need, the control unit (94) in a second sequence also opens both stop valves (2, 5) and control the hydraulic machine (3) in order to allow the desired lowering speed, transmitted from the operation unit to the control unit (94), up to the maximal capacity of the hydraulic machine, and that in a third sequence, when the hydraulic machine has been controlled to maximal flow, the control unit (94) will via control of the proportional valve (62) allow an additional flow for a further increased lowering speed.

11. Mobile handling device with a hydraulic circuit according to claim 1, wherein the maximal flow capacity for said hydraulic machine (3) is at least 5% less than the maximal output flow from said lifting cylinder (1) at a rapid lowering motion.

12. Mobile handling device with a hydraulic circuit according to claim 11, wherein the maximal flow capacity for said hydraulic machine (3) is at least 20% less than the maximal output flow from said lifting cylinder (1) at a rapid lowering motion.

13. Mobile handling device with a hydraulic circuit according to claim 12, wherein the maximal flow capacity for said hydraulic machine (3) is at least 30% less than the maximal output flow from said lifting cylinder (1) at a rapid lowering motion.

* * * * *